US012677140B2

(12) United States Patent
Ryu et al.

(10) Patent No.: US 12,677,140 B2
(45) Date of Patent: Jul. 7, 2026

(54) SYSTEMS AND METHODS FOR UNIQUELY IDENTIFYING USER EQUIPMENT WITH A WIRELESS NETWORK

(71) Applicant: Boost SubscriberCo L.L.C., Englewood, CO (US)

(72) Inventors: Jinsook Ryu, Oakton, CA (US); Kazi Bashir, Lewisville, TX (US)

(73) Assignee: Boost SubscriberCo L.L.C., Englewood, CO (US)

( * ) Notice: Subject to any disclaimer, the term of this patent is extended or adjusted under 35 U.S.C. 154(b) by 327 days.

(21) Appl. No.: 18/524,488

(22) Filed: Nov. 30, 2023

(65) Prior Publication Data

US 2024/0196202 A1     Jun. 13, 2024

Related U.S. Application Data

(60) Provisional application No. 63/431,387, filed on Dec. 9, 2022.

(51) Int. Cl.
| | |
|---|---|
| *H04W 8/26* | (2009.01) |
| *H04W 8/20* | (2009.01) |
| *H04W 76/10* | (2018.01) |

(52) U.S. Cl.
CPC .............. *H04W 8/26* (2013.01); *H04W 8/20* (2013.01); *H04W 76/10* (2018.02)

(58) Field of Classification Search
CPC ......... H04W 8/20; H04W 8/26; H04W 60/00; H04W 76/10; H04W 76/11
See application file for complete search history.

(56) References Cited

U.S. PATENT DOCUMENTS

| | | | | |
|---|---|---|---|---|
| 11,419,046 B2 * | 8/2022 | Fiorese | ................. | H04L 63/108 |
| 11,483,278 B1 | 10/2022 | Lifshitz | | |

(Continued)

FOREIGN PATENT DOCUMENTS

| | | | | |
|---|---|---|---|---|
| EP | 3897066 A1 * | 10/2021 | ......... | H04L 12/1407 |
| EP | 3897066 A4 * | 10/2021 | ......... | H04L 12/1407 |

(Continued)

OTHER PUBLICATIONS

Laurent Thiebaut et al: "Update to the solution 20 (UE IP address mapping information exposure by UPF)", 3GPP Draft; S2-2208222; Type PCR; FS_UPEAS, 3rd Generation Partnership Project (3GPP), Mobile Competence Centre; 650, Route Des Lucioles; F-06921 Sophia-Antipolis Cedex; France; vol. 3GPP SA 2, No. Online; Oct. 10, 2022-Oct. 17, 2022 Sep. 30, 2022, XP052207987, Retrieved from the Internet: URL: https://www.3gpp.org/ftp/tsg_sa/WG2_Arch/TSGX2_153E_Electronic_2022-10/Docs/S2-2208222.zip S2-2208222 UPEAS-NAT sol upd V1.docx [retrieved on Sep. 30, 2022].

(Continued)

*Primary Examiner* — Eric Nowlin
(74) *Attorney, Agent, or Firm* — Kilpatrick Townsend & Stockton LLP

(57) ABSTRACT

Systems, devices, methods, and non-transitory, machine-readable media for uniquely identifying user equipment with a wireless network may include one or a combination of the following. A cellular network core may include a user plane function (UPF). The UPF may collect and store subscription permanent identifier (SUPI) information and/or generic public subscription identifier (GPSI) information corresponding to user equipment (UE) having an IP address. In response to a request, the cellular network core may execute a conditional process based at least in part on the UPF using the SUPI information and/or the GPSI information as part of the (Continued)

conditional process to respond to the request. The request may be for GPSI information corresponding to the UE. An external IP address of the UE may be provided along with the request. Upon completion of the conditional process, the cellular network core may return the GPSI information corresponding to the UE.

20 Claims, 7 Drawing Sheets

(56) References Cited

U.S. PATENT DOCUMENTS

| | | | | |
|---|---|---|---|---|
| 11,589,400 | B2 * | 2/2023 | Colom Ikuno | H04W 76/10 |
| 11,729,105 | B2 | 8/2023 | Alisawi et al. | |
| 11,736,936 | B2 * | 8/2023 | Colom Ikuno | H04W 8/18 |
| | | | | 455/435.1 |
| 11,895,083 | B2 | 2/2024 | Ge et al. | |
| 12,439,242 | B2 * | 10/2025 | Tao | H04W 4/02 |
| 2014/0325091 | A1 | 10/2014 | Hong | |
| 2018/0227873 | A1 | 8/2018 | Vrzic et al. | |
| 2019/0261453 | A1 * | 8/2019 | Jain | H04W 8/183 |
| 2021/0014766 | A1 | 1/2021 | Liu | |
| 2021/0168705 | A1 * | 6/2021 | Fiorese | H04W 12/037 |
| 2021/0321251 | A1 * | 10/2021 | Colom | H04W 76/11 |
| 2021/0321466 | A1 * | 10/2021 | Colom | H04W 76/10 |
| 2021/0352575 | A1 | 11/2021 | Chun | |
| 2022/0104004 | A1 | 3/2022 | Huang et al. | |
| 2022/0116330 | A1 | 4/2022 | Alisawi et al. | |
| 2023/0037031 | A1 | 2/2023 | Wang et al. | |
| 2023/0171598 | A1 * | 6/2023 | Normann | H04W 8/18 |
| | | | | 455/410 |
| 2023/0188974 | A1 * | 6/2023 | Yu | H04L 41/12 |
| | | | | 455/419 |
| 2023/0199480 | A1 * | 6/2023 | Tao | H04L 67/52 |
| | | | | 370/338 |
| 2023/0247094 | A1 * | 8/2023 | Wang | G06F 16/182 |
| | | | | 709/217 |
| 2023/0300104 | A1 | 9/2023 | Thiebaut et al. | |
| 2023/0388914 | A1 | 11/2023 | Qiao et al. | |
| 2023/0396993 | A1 * | 12/2023 | Colom | H04L 12/1407 |
| 2024/0283698 | A1 * | 8/2024 | Feng | H04W 8/20 |

FOREIGN PATENT DOCUMENTS

| | | | | | |
|---|---|---|---|---|---|
| EP | | 3897066 | B1 * | 12/2023 | H04L 12/1407 |
| EP | | 4070591 | B1 * | 12/2025 | H04W 84/042 |
| WO | | 2020/221658 | A1 | 11/2020 | |
| WO | WO-2022006320 | A1 * | 1/2022 | | H04L 9/50 |
| WO | WO-2024170621 | A1 * | 8/2024 | | H04L 61/2591 |
| WO | WO-2024238267 | A1 * | 11/2024 | | H04W 12/0431 |

OTHER PUBLICATIONS

Jinsook Ryu et al: "KI #2,. New Sol: UE IP address mapping information expos re by UPF", 3GPP Draft; S2-2205585; Type PCR; FS_UPEAS, 3rd Generation Partnership Project (3GPP) 1 Mobile Competence Centre ; 650, Route Des Lucioles ; F-06921 Sophia-Antipolis Cedex; France vol. 3GPP SA 2, No. Qnline; Aug. 17, 2022-Aug. 26, 2022 Aug. 10, 2022 (Aug. 10, 2022), XP052183985, Retrieved from the Internet: URL:https://.3gpp.org/ftp/tsg_sa/WG2_. Ar tjl/TSG 2_152E_Electronic_2022-08/Docs/S2-2205585.zip S2-2205585 FS_UPEAS KI2 New Solution.docx [retrieved on Aug. 10, 2022.J paragraph [6.x.2].

* cited by examiner

TS 29.244 7.5.2 PFCP Session Establishment Request

Table 7.5.2.1-1: Information Elements in a PFCP Session Establishment Request (From SMF → UPF)

| Information elements | P | Condition / Comment | Appl. | | | | | IE Type |
|---|---|---|---|---|---|---|---|---|
| | | | Sxa | Sxb | Sxc | N4 | N4 mb | |
| ... | | | | | | | | |
| User ID | O | This IE may be present, based on operator policy. It shall only be sent if the UP function is in a trusted environment. See NOTE. | X | X | X | X | - | User ID |

8.2.101  User ID

The User ID IE type shall be encoded as shown in Figure 8.2.101-1.

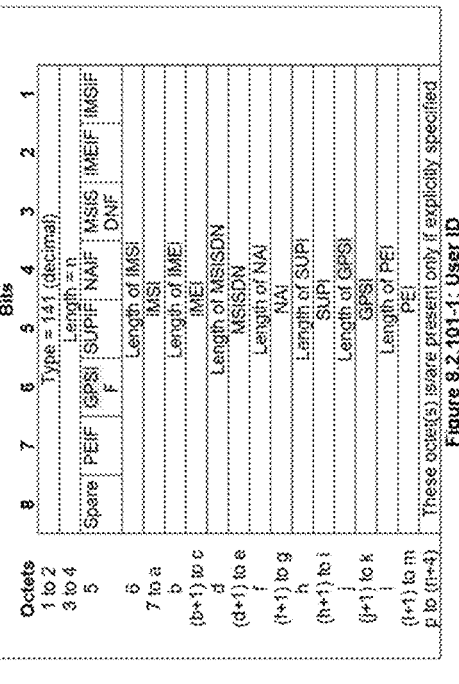

Figure 8.2.101-1: User ID

SYSTEMS AND METHODS FOR UNIQUELY IDENTIFYING USER EQUIPMENT WITH A WIRELESS NETWORK

CROSS REFERENCE TO RELATED APPLICATION

This application claims priority to U.S. Provisional Patent Application No. 63/431,387, filed on Dec. 9, 2022, the disclosure of which is incorporated by reference in its entirety for all purposes.

BACKGROUND

Users use user equipment (UE) that communicates through a cellular network to access various networks, such as the Internet. Such access may include the user causing the UE to access a particular webpage. Such access may also include use of a service accessible via the Internet, such as a messaging application, gaming application, streaming application, business application, etc. Despite UE needing to generally have access to the Internet, care must be taken to ensure security on the cellular network is maintained. Further, particular applications or uses of the UE may require unique identification and special handling specific to the UE in order to ensure an acceptable quality of experience (QoE) for the user and/or acceptable quality of service (QoS) parameters are met.

BRIEF SUMMARY

Certain embodiments according to the present disclosure relate generally to cellular networks and more particularly to systems, devices, methods, and non-transitory, machine-readable media for uniquely identifying user equipment with a wireless network.

In one aspect, a system to uniquely identify user equipment with a wireless network may include one or a combination of the following. A cellular network core may include a user plane function (UPF). The UPF may collect and store subscription permanent identifier (SUPI) information and/or generic public subscription identifier (GPSI) information corresponding to particular user equipment (UE) having a particular IP address. In response to a request, the cellular network core may execute a conditional process based at least in part on the UPF using the SUPI information and/or the GPSI information as part of the conditional process to respond to the request. The request may be for GPSI information corresponding to the particular UE. An external IP address of the particular UE may be provided along with the request. Upon completion of the conditional process, the cellular network core may return the GPSI information corresponding to the particular UE.

In another aspect, a method to uniquely identify user equipment with a wireless network may include one or a combination of the following. Subscription permanent identifier (SUPI) information and/or generic public subscription identifier (GPSI) information corresponding to particular user equipment (UE) having a particular IP address may be collected by a user plane function (UPF) of a cellular network core. The SUPI information and/or the GPSI information corresponding to the particular UE having the particular IP address may be stored by the UPF. In response to a request, the cellular network core may execute a conditional process based at least in part on the UPF using the SUPI information and/or the GPSI information to respond to the request. The request may be for GPSI information corresponding to the particular UE. An external IP address of the particular UE may be provided along with the request. Upon completion of the conditional process, the cellular network core may return the GPSI information corresponding to the particular UE.

In yet another aspect, one or more non-transitory, machine-readable media having machine-readable instructions thereon which, when executed by one or more processing devices, may cause the one or more processing devices to perform operations to uniquely identify user equipment with a wireless network. The operations may include one or a combination of the following. Subscription permanent identifier (SUPI) information and/or generic public subscription identifier (GPSI) information corresponding to particular user equipment (UE) having a particular IP address may be collected by a user plane function (UPF) of a cellular network core. The SUPI information and/or the GPSI information corresponding to the particular UE having the particular IP address may be stored by the UPF. In response to a request, the cellular network core may execute a conditional process based at least in part on the UPF using the SUPI information and/or the GPSI information to respond to the request. The request may be for GPSI information corresponding to the particular UE. An external IP address of the particular UE may be provided along with the request. Upon completion of the conditional process, the cellular network core may return the GPSI information corresponding to the particular UE.

In various embodiments, the UPF may collect and store the SUPI information and/or the GPSI information as part of establishing a session involving the particular UE having the particular IP address. In various embodiments, the UPF may receive the SUPI information and/or the GPSI information from a session management function (SMF) of the cellular network core. In various embodiments, the conditional process may allow for bypassing of subprocesses involving a binding support function (BSF) of the cellular network core when the UPF uses the stored SUPI information. In various embodiments, the conditional process may allow for bypassing of subprocesses involving a unified data management (UDM) of the cellular network core when the UPF uses the stored GPSI information.

In various embodiments, the request may be from a traffic analysis gateway. In various embodiments, the request may be directed to a network exposure function (NEF) of the cellular network core. In various embodiments, the cellular network core may receive an external IP address of the particular UE along with the request. In various embodiments, the cellular network core may return the GPSI information corresponding to the particular UE to an application function.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 6 illustrates a table indicating a portion of a session establishment request from a session management function (SMF) to a UPF that may include a user ID.

DETAILED DESCRIPTION

Figure 1:
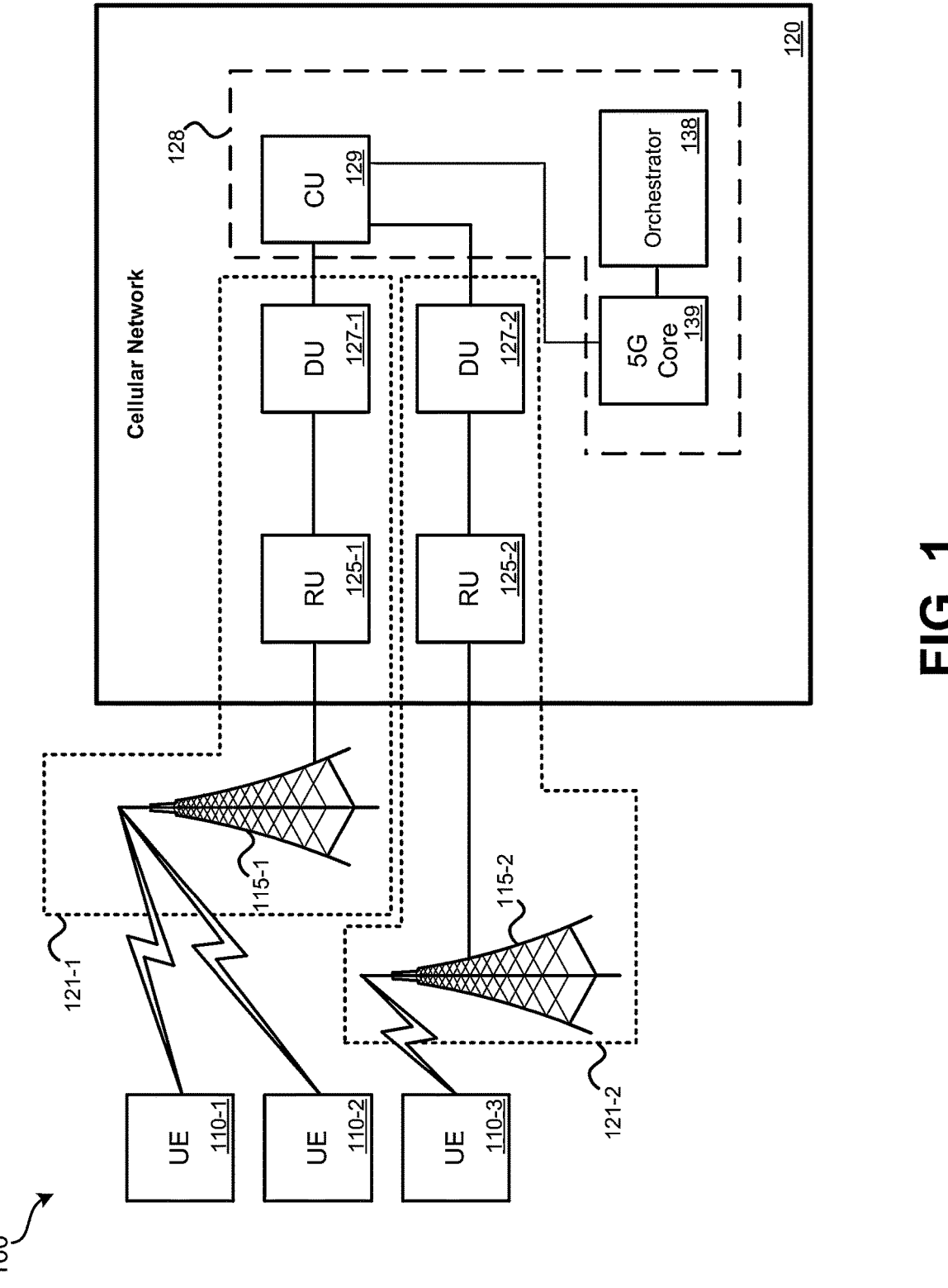
FIG. 1 illustrates an embodiment of a hybrid-cloud cellular network.

A user plane function (UPF) resides within a core of a cellular network, such as the core of a 5G New Radio (NR) cellular network. The UPF serves as a gateway for network traffic between user equipment (UE) residing on the cellular network and an external network, which may be the Internet. A user of a UE connected with the cellular network may use the UE to access webpages or other services accessible via the Internet. Such services and applications may include: voice services and applications; video services and applications; gaming services and applications; communication services and applications; business services and applications; and emergency services and applications.

In may be beneficial to uniquely identify UE and analyze communication traffic passing through the UPF and possibly perform some action, such as applying a policy to the traffic or the uniquely identified UE associated with the traffic, based upon the analysis. Not all traffic for a UE (uplink traffic and/or downlink traffic) is legitimate or secure. Therefore, situations may exist when particular traffic for a uniquely identified UE should be blocked, such as traffic that is suspicious, such as traffic that is possibly part of a distributed denial-of-service (DDOS) attack. As another example, particular applications and services may have varying needs in order to function sufficiently for a user of the uniquely identified UE to have a sufficient QoE. For example, a particular video chat application may require that particular latency requirements be met in order for a user to have an acceptable QoE.

As detailed herein, by configuring a UPF of a cellular network to output particular information relevant to particular UE, security, and/or QoE for applications and services may be improved. The UPF may be configured to output a mapping indicative of a public address (the address of a UE outside of the cellular network, which may, for example, correspond to a public IP address) with a network address (the address of the UE on the cellular network, which may, for example, correspond to a Generic Public Subscription Identifier (GPSI) identifier). The UPF may additionally or alternatively be configured to output QoS parameters for communication traffic for a particular, uniquely identified UE through the UPF or communication traffic for a particular application or service being used by uniquely identified UE through the UPF.

Some embodiments detailed herein may use a traffic analysis gateway (TAG). The TAG may be one example of an application function (AF). Other embodiments may involve any suitable type of AF, instead of the TAG. Thus, embodiments disclosed herein may be applicable to any suitable AF, including the TAG.

The TAG may analyze communication traffic passing through the UPF. Such analysis may involve deep packet inspection (DPI). Based upon an event being detected (e.g., suspicious or excessive traffic for a UE, a particular application or service being used by the UE), the TAG may obtain data from the UPF that indicates a mapping between a network address (e.g., GPSI identifier) for the UE and the public address for the UE outside of the cellular network so that the UE may be uniquely identified. The TAG may then determine whether a particular policy should be applied internally on the cellular network for the uniquely identified UE generally, application-specific traffic for the uniquely identified UE, or service-specific traffic for the uniquely identified UE. The internal policy applied within the cellular network may perform various purposes. For example, the uniquely identified UE may be reassigned to a cellular network slice with higher security, data associated with the application or service may receive higher than normal priority on the cellular network, or some other action may be performed.

In order to provide various features specific to a particular UE, the TAG may need a static ID of the UE. However, the TAG may initially only have a public IP address of the public packet data network for one or more packets that the TAG has identified to be of interest (e.g., a potential or actual security threat). The TAG may need to obtain the static ID of the UE device sending the one or more packets to the TAG. For example, in a wireless network (e.g., a 5G network), the UE device may initiate a session, and the network may locate the public or private IP address, which may vary and may not precisely identify the UE device.

Disclosed embodiments may allow for the TAG to obtain the static, unique identity of the UE corresponding to its private IP address. Disclosed embodiments may provide for a wireless network core to use network address translation (NAT) to provide the static, unique identity of the UE corresponding to its private IP address, in response to the TAG requesting such identity from the network core, where the TAG provides only the public IP address with the request. Disclosed embodiments allow the return of NAT'd IP address information, where the UPF provides translation information to support TAG use of public IP addresses to internally translate the public IP addresses within the core to internal IP addresses. Moreover, disclosed embodiments may provide for improvement over conventional procedures that are too complicated and require too much handshaking to provide information from the core. Accordingly, disclosed embodiments are faster and more efficient than conventional procedures.

Further detail regarding such embodiments is provided in relation to the figures. The implementations detailed herein may be implemented on a hardware-based cellular network. A hardware-based cellular network may use specialized or general-purpose computing hardware maintained directly by the cellular network provider to provide cellular services.

Alternatively, implementations detailed herein may be performed on a hybrid-cloud cellular network, such as detailed in relation to FIG. 1.

The core of a 5G New Radio (NR) cellular network may employ a service-based architecture (SBA) using a service-based interface. At the core of most modern networks and services is typically a cloud-based and virtualization-based platform. This is also the case for 5G networks. A cloud-based and virtualization-based platform may be programmable and may allow many different functions to be built, configured, connected, and deployed at the scale that is needed at the given time. The 3GPP defines an SBA whereby the control plane functionality and common data repositories of a 5G NR network are delivered by way of a set of interconnected network functions (NFs), each with authorization to access each other's services. SBAs may provide a modular framework from which common applications may be deployed using components of varying sources and suppliers. The service-based interface may function based on API calls.

FIG. 1 illustrates a block diagram of a hybrid cellular network system ("system 100"). Such a hybrid cellular network system is partially implemented using specialized hardware and partially implemented using virtualized cellular network components on a cloud-computing platform, such as Amazon Web Services (AWS). System 100 may include a 5G New Radio (NR) cellular network; as noted, other types of cellular networks, such as 6G, 7G, etc., may also be possible. System 100 may include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139; and orchestrator 138. FIG. 1 represents a component-level view. In a virtualized open radio access network (O-RAN), because components may be implemented as specialized software executed on general-purpose hardware, except for components that need to receive and transmit RF, the functionality of the various components may be executed by general-purpose servers. For at least some components, the hardware may be maintained by a separate cloud-service computing platform provider. Therefore, the cellular network operator may operate some hardware, such as base stations that include RUs and local computing resources on which DUs are executed, such components may be connected with a cloud-computing platform on which other cellular network functions (NFs), such as the cellular network core and higher-level RAN components, such as CUs, are executed.

UE 110 may represent various types of end-user devices, such as cellular phones, smartphones, cellular modems, cellular-enabled computerized devices, sensor devices, robotic equipment, IoT devices, gaming devices, access points (APs), or any computerized device capable of communicating via a cellular network. More generally, UE may represent any type of device that has an incorporated 5G interface, such as a 5G modem. Examples may include sensor devices, Internet of Things (IoT) devices, manufacturing robots, unmanned aerial (or land-based) vehicles, network-connected vehicles, etc. Depending on the location of individual UEs, UE 110 may use RF to communicate with various BSs of cellular network 120. As illustrated, two BSs are illustrated; BS 121-1 may include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas may reasonably be mounted to provide cellular coverage to a geographic area. Similarly, BS 121-2 may include: structure 115-2, RU 125-2, and DU 127-2.

Real-world implementations of system 100 may include many (e.g., thousands) of BSs and many CUs and 5G core 139. BS 121-1 may include one or more antennas that allow RUs 125 to communicate wirelessly with UEs 110. RUs 125 may represent an edge of cellular network 120 where data is transitioned to RF for wireless communication. The radio access technology (RAT) used by RU 125 may be 5G NR, or some other RAT. The remainder of cellular network 120 may be based on an exclusive 5G architecture, a hybrid 4G/5G architecture, or some other cellular network architecture that supports cellular network slices. BS 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU may also operate on three bands. One or more DUs, such as DU 127-1, may communicate with CU 129. Collectively, an RU, DU, and CU create a gNodeB, which serves as the radio access network (RAN) of cellular network 120. DUs 127 and CU 129 may communicate with 5G core 139. The specific architecture of cellular network 120 may vary by embodiment. Edge cloud server systems (not illustrated) outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 may vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In a virtualized arrangement, specialized software on general-purpose hardware may be used to perform the functions of components such as DU 127, CU 129, and 5G core 139. Functionality of such components may be co-located or located at disparate physical server systems. For example, certain components of 5G core 139 may be co-located with components of CU 129.

In a possible virtualized implementation, CU 129, 5G core 139, and/or orchestrator 138 may be implemented virtually as software being executed by general-purpose computing equipment on cloud-computing platform 128, as detailed herein. Therefore, depending on needs, the functionality of a CU, and/or 5G core may be implemented locally to each other and/or specific functions of any given component may be performed by physically separated server systems (e.g., at different server farms). For example, some functions of a CU may be located at a same server facility as where 5G core 139 is executed, while other functions are executed at a separate server system or on a separate cloud computing system. In the illustrated embodiment of system 100, cloud-computing platform 128 may execute CU 129, 5G core 139, and orchestrator 138. The cloud-computing platform 128 may be a third-party cloud-based computing platform or a cloud-based computing platform operated by the same entity that operates the RAN. Cloud-based computing platform 128 may have the ability to devote additional hardware resources to cloud-based cellular network components or implement additional instances of such components when requested.

Kubernetes, Docker®, or some other container orchestration platform, may be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. Rather, processing and storage capabilities of the data center would be devoted to the needed functions. When the need for the logical CU or subcomponents of the CU no longer exists, Kubernetes may allow for removal of the logical CU. Kubernetes may also be used to control the flow of data (e.g., messages) and inject a flow of data to various components. This arrangement may allow for the modification of nominal behavior of various layers.

The deployment, scaling, and management of such virtualized components may be managed by orchestrator 138. Orchestrator 138 may represent various software processes executed by underlying computer hardware. Orchestrator 138 may monitor cellular network 120 and determine the amount and location at which cellular network functions should be deployed to meet or attempt to meet service level agreements (SLAs) across slices of the cellular network.

Orchestrator 138 may allow for the instantiation of new cloud-based components of cellular network 120. As an example, to instantiate a new CU for test, orchestrator 138 may perform a pipeline of calling the CU code from a software repository incorporated as part of, or separate from cellular network 120, pulling corresponding configuration files (e.g. helm charts), creating Kubernetes nodes/pods, loading CU containers, configuring the CU, and activating other support functions (e.g. Prometheus, instances/connections to test tools).

As previously noted, a cellular network slice functions as a virtual network operating on an underlying physical cellular network. Operating on cellular network 120 is some number of cellular network slices, such as hundreds or thousands of network slices. Communication bandwidth and computing resources of the underlying physical network may be reserved for individual network slices, thus allowing the individual network slices to reliably meet defined SLA requirements. By controlling the location and amount of computing and communication resources allocated to a network slice, the QoS and QoE for UE may be varied on different slices. A network slice may be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus, optimization between performance and cost is desirable.

Particular parameters that may be set for a cellular network slice may include: uplink bandwidth per UE; downlink bandwidth per UE; aggregate uplink bandwidth for a client; aggregate downlink bandwidth for the client; maximum latency; access to particular services; and maximum permissible jitter. Particular network slices may only be reserved in particular geographic regions. For instance, a first set of network slices may be present at RU 125-1 and DU 127-1, and a second set of network slices, which may only partially overlap or may be wholly different from the first set, may be reserved at RU 125-2 and DU 127-2.

Further, particular cellular network slices may include multiple defined slice layers. Each layer within a network slice may be used to define parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2:
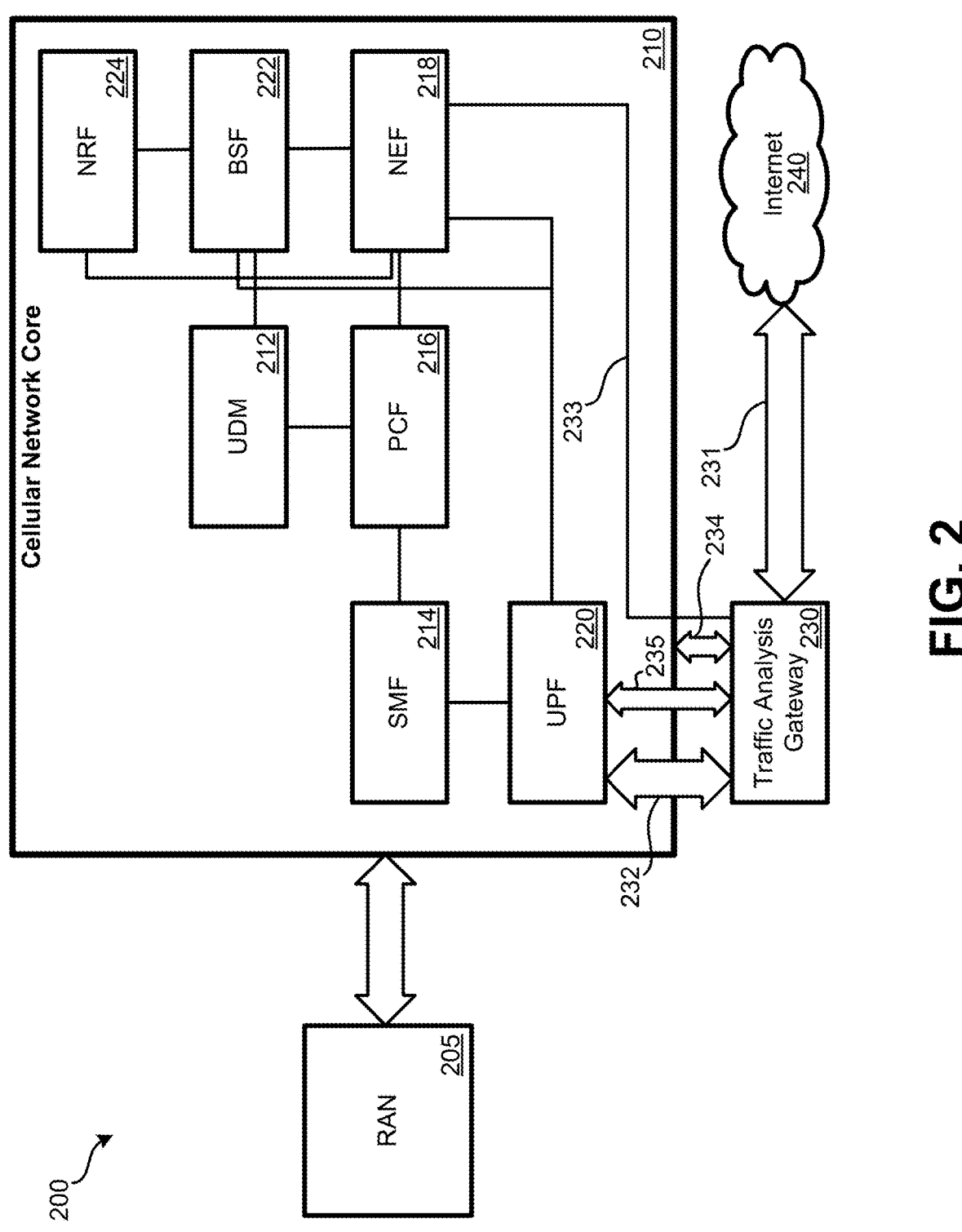
FIG. 2 illustrates an embodiment of a system that includes a cellular network core that exposes data from the user plane function (UPF) that may include static, unique identifiers of particular user equipment (UE).

FIG. 2 illustrates an embodiment of a cellular network system 200 ("system 200") that includes a cellular network core that exposes data from the user plane function (UPF) that may include static, unique identifiers of particular UE 110, as disclosed herein. Cellular network core 210 ("core 210") may represent an embodiment of 5G core 139 of FIG. 1. Core 210 may include: Unified Data Management 212 ("UDM 212"); Session Management Function 214 ("SMF 214"); Policy Control Function 216 ("PCF 216"); Network Exposure Function 218 ("NEF 218"); UPF 220; Binding Support Function 222 ("BSF 222"); and Network Repository Function ("NRF 224").

UDM 212 is a network function that manages access authorization, user registration, and roaming access. SMF 214 manages interactions on the data plane, creation and removal of protocol data unit sessions and managing session context with the UPF. PCF 216 governs control plane functions and the UPF via defined policy rules. BSF 222 stores binding information for PDU sessions and facilitates discovery of NFs and events per the binding information. NRF 224 maintains a repository of the network functions instances and profiles and facilitates registration and discovery of network functions.

NEF 218 facilitates exposure of network services and capabilities to trusted components outside of the cellular network core. NEF 218 may act as a consolidated application programming interface (API) for components of core 210. Via NEF 218, permissions and access to data from core components, including UPF 220, may be controlled. NEF 218 may provide for application functions to securely provide information to a 3GPP network. In this case, the NEF may authenticate, authorize, and/or assist in throttling application functions.

UPF 220 is responsible for packet routing and forwarding between external networks from the cellular network (e.g., Internet 240) and UE communicating with RAN 205 of the cellular network. RAN 205 may represent BSs 121 of cellular network 120 of FIG. 1. UPF 220 functions as a gateway in that cellular network addressed traffic inside of core 210 and RAN 205 is translated to have an external IP address appropriate for communication via Internet 240. From the perspective of a UE, all inbound and outbound Internet communications flows through UPF 220. Therefore, by monitoring data passing through UPF 220, the Internet traffic for all UE using the cellular network for Internet access may be monitored.

Figure 3:
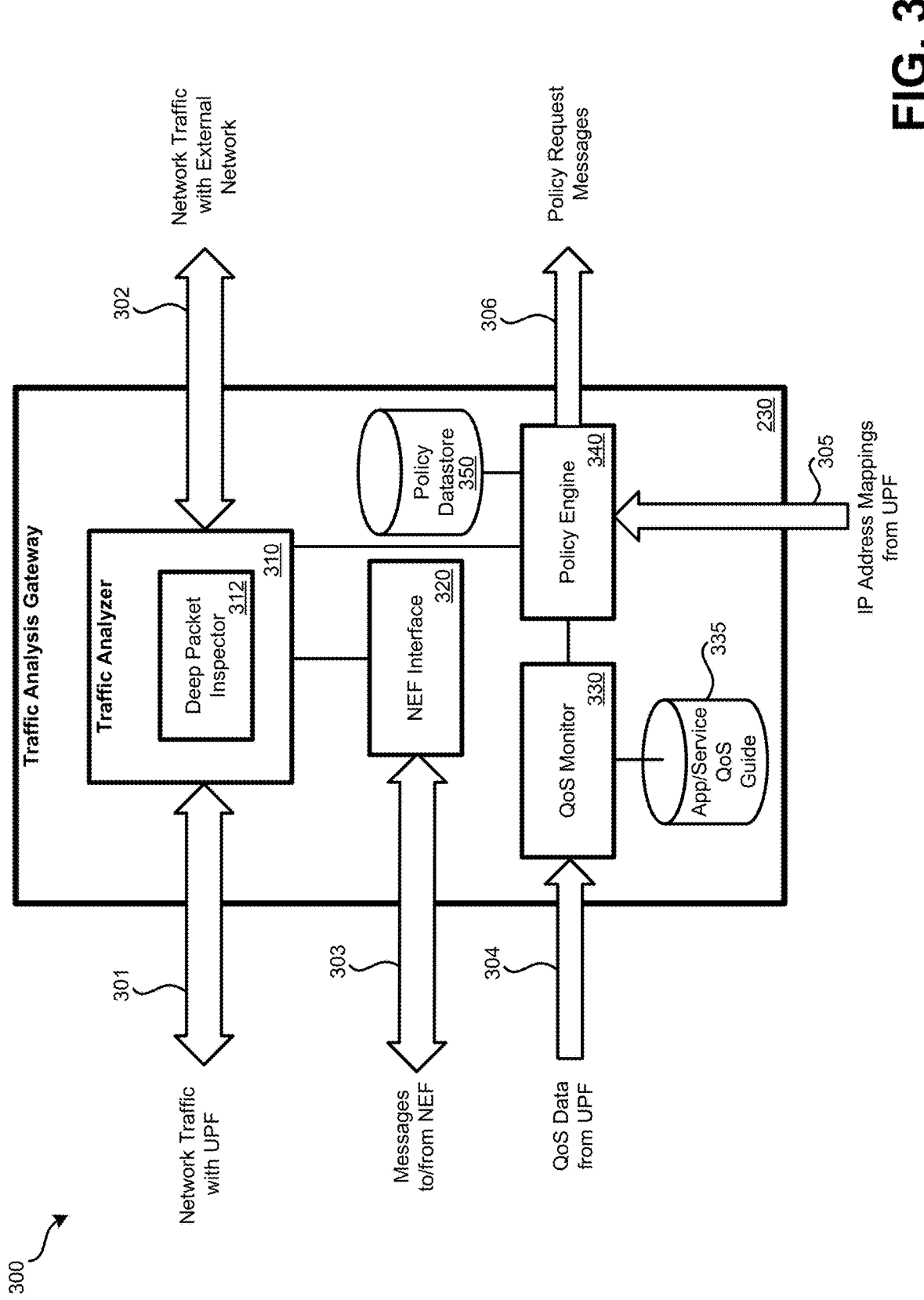
FIG. 3 illustrates an embodiment of a traffic analysis gateway.

In system 200, TAG 230, which is an example of an application function (AF) and is detailed in relation to FIG. 3, is present. TAG 230 monitors inbound and/or outbound communication traffic between UPF 220 and Internet 240. TAG 230 may be positioned between UPF 220 and Internet 240 such that Internet traffic inbound and outbound from UPF 220 passes through TAG 230. Internet traffic 231 and internet traffic 232 may have external IP addresses attached. Without information from UPF 220, TAG 230 may be unable to determine which UE on the cellular network or cellular network address that is associated with the external IP address. Inbound and/or outbound communication traffic may be analyzed by TAG 230. Based on an event being detected in traffic associated with a particular external IP address, traffic analysis gateway may transmit a request 233 for access to UPF data to NEF 218. This request may indicate the external IP address for which the event was detected. This request may be in the form of an API call. If NEF 218 approves the request, NEF 218 transmits a message, which may include the external IP address (e.g., public UE IP address) for which the event was detected, to NRF 224 that cause NRF 224 to return a UPF address corresponding to the external IP address. NEF 218 may then use the UPF address (e.g., for the correct UPF 220) to transmit a request that includes the external IP address to UPF 220 that causes UPF data 235 to be output to TAG 230 (e.g., by way of NEF 218 in some embodiments).

UPF data 235 (which may be received via NEF 218 in some embodiments) may include various pieces of information, such as: 1) a mapping of the external IP address to a cellular network address for the UE (e.g., a mapping of public IP address for a particular UE device to the Generic Public Subscription Identifier (GPSI) of the UE device); and/or 2) one-time, occasional, or periodic direct reporting of QoS monitoring events (DRQOS). In various embodiments, UPF data 235 may be transmitted by UPF 220 to TAG 230 by virtue of permission being granted to UPF 220 via NEF 218; alternatively, data may be transmitted by UPF 220 to TAG 230 via NEF 218. NEF 218 may operate in some aspects like a gateway for communications between the 5G core and the outside network, providing security and protection of internal information from outside interference. Data from UPF 220 may be transmitted in the form of an API call.

Depending on the type of event detected, TAG 230 may take various actions. If a security event has been detected, such as inbound or outbound data being associated with a DDOS attack, virus, or some other security event, TAG 230 may block inbound and/or outbound traffic associated with the UE. TAG 230 may send core 210 policy request 234. Policy request 234 may request that a policy be applied to a particular cellular network address (and, therefore, for a particular UE). The policy request may request that a policy be applied that: increases security; isolates the UE's traffic on a designated slice; causes one or more NFs to not be available; causes one or more additional NFs to be used; decreases the uplink and/or downlink bandwidth provided to the UE; and/or some other action.

If the event detected is the use of some particular service or application, TAG 230 may use the DRQOS to determine if a policy should be applied that alters the QoS provided to the UE on the cellular network. For example, the particular services or applications that may be monitored for may include various over-the-top (OTT) communication services, such as Skype, WhatsApp, media streaming services (e.g., Spotify, Tidal, Netflix, Disney+, AppleTV, Prime Video, etc.). Depending on the DRQOS data, if one or more thresholds are triggered (e.g., uplink bandwidth, downlink bandwidth, jitter, uplink packet delay, downlink packet delay, and/or roundtrip packet delay between the UPF and UE on the cellular network exceeding defined threshold values), a policy may be applied to the cellular network address (and, thus, the UE) for which the event was detected that helps improve performance for the application or service. Such thresholds may be particular to the application or service and may have been defined by the application provider, service provider, or cellular network operator. The policy may generally improve performance for all traffic for the UE or only traffic associated with the particular service or application. In some arrangements, such a policy may instead be used to decrease performance for a particular service or application, such as a service or application that the cellular network operator wants to discourage users from using (e.g., downloads from sources known to host pirated material) or is perhaps associated with security vulnerabilities (e.g., downloads from sources known to host viruses).

As an example, TAG 230 may analyze internet traffic associated with a particular external IP address. Based on the analysis, TAG 230 may determine that the traffic is associated with a particular gaming service (e.g., based on the IP address to which data is being sent by the UE). TAG 230 may send a request indicating the external IP address to NEF 218 along with an indication that TAG 230 is requesting DRQOS data, which may in turn approve and send the request to UPF 220. UPF 220 may then output the DRQOS data to TAG 230 along with a mapping between the external IP address and a cellular network address (e.g., GPSI identifier). Depending on the DRQOS data, TAG 230 may or may not request core 210 to apply a particular policy to the cellular network address. As another example, TAG 230 may determine whether network address translation (NAT) may be needed.

As another example, TAG 230 may analyze outbound internet traffic associated with a particular external IP address. Based on the analysis, TAG 230 may determine that the traffic is related to a security event. TAG 230 may send a request indicating the external IP address to NEF 218 along with an indication that TAG 230 is requesting an IP mapping. NEF 218 may, in turn, approve and send the request to UPF 220. UPF 220 may then output the mapping between the external IP address and a cellular network address. TAG 230 may then send policy request 234 requesting that a particular policy be applied to the cellular network address mapped to the external IP address for which the security event was detected.

In some embodiments, based on policy request 234, a message may be transmitted to and output by the UE that acts as a report to the user. For example, if a UE or cellular network address of the UE is determined to be involved in a DDOS attack, the UE may be caused to present a message that indicates as such and recommend steps for the user of the UE to take. If a policy is applied to improve performance for a particular application, a message may be output to the UE that indicates that a policy has been applied to improve the QoE for the particular application.

FIG. 3 illustrates an embodiment 300 of TAG 230 with various data traffic. TAG 230 may include: traffic analyzer 310; NEF interface 320; QoS monitor 330; Application/

Service QoS Guide 335; policy engine 340; and policy datastore 350. Components of TAG 230 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random-access memory (RAM), flash memory, a hard-disk drive (HDD), or a solid-state drive (SSD). Further, the functions of the components of TAG 230 may be implemented using a cloud-computing platform, which is operated by a separate cloud-service provider that executes code and provides storage for clients. For example, as detailed in relation to FIG. 1, TAG 230 may be implemented on the cloud-computing platform that hosts 5G core 139.

Traffic analyzer 310 may analyze inbound and/or outbound traffic between a UPF and an external network, such as the Internet. Therefore, traffic 301 may be exchanged with a UPF and traffic 302 may be exchanged with the external network. In some embodiments, DPI may be performed by deep packet inspector 312 to determine a particular service or application corresponding to traffic. Such DPI may also be beneficial for analyzing security risks. Some forms of analysis that may be performed by traffic analyzer 310 may include: monitoring inbound data volumes for an external IP address; monitoring outbound data volumes for the external IP address; monitoring addresses to which data is being transmitted to and/or received from.

NEF interface 320 may serve to send messages 303 or requests for data to the NEF of the cellular network core. These messages may include data such as: 1) the type of data requested (e.g., DRQOS data, IP mapping data that maps the external IP address to a static, unique identifier such as a GPSI identifier); 2) the external IP address for which the data is requested; and possibly 3) a time duration for which the data should be provided. In response to the NEF approving the request, the UPF may be triggered to output QoS data 304 to QoS monitor 330.

QoS monitor 330 may analyze QoS data 304 received from the UPF and compare such data with corresponding thresholds in App/Service QoS Guide 335. App/Service QoS Guide 335 may be organized such that particular thresholds (or other forms of performance parameters) are mapped to particular services or applications. The particular threshold relevant to the one or more applications or services for which the QoS data is received from the UPF may be compared with the QoS data by QoS monitor 330. If the comparison indicates that a policy should be applied to improve (or decrease) performance, policy engine 340 may be triggered to do so.

Policy engine 340 may cause the cellular network core to apply one or more policies to a particular internal cellular network address (which would apply to a particular UE). A policy request message 306 may indicate: 1) the cellular network address (e.g., GPSI identifier) to which the policy should be applied; 2) an identifier of the policy or parameters of the policy to apply; and possibly 3) an amount of time for which the policy should be applied. Such policy request messages 306 may be transmitted to the cellular network core.

Policy engine 340 may receive or otherwise be able to access IP address mappings received from the UPF. IP address mapping 305 may indicate the cellular network address (e.g., GPSI identifier) mapped to a particular external IP address (e.g., public IP address). While traffic analyzer 310 may detect events associated with external IP addresses, policies may be applied by the cellular network core to cellular network addresses; therefore, when a policy request message 306 is sent to the cellular network core, the correct cellular network address may need to be indicated.

Policy engine 340 based on a trigger from QoS monitor 330 and/or an indication of the type of event detected for the external network address from traffic analyzer 310 may cause a policy, as indicated in policy datastore 350, to be applied by sending policy request message 306. In some situations, such as for a security event, QoS data may not be relevant; therefore, policy engine 340 may only need the correct cellular network address for which a policy should be applied. Policies in policy datastore 350 may be indicated by an identifier (or parameters) and the circumstances under which the policy should be applied. For example, a policy may be applied based on a particular type of event (e.g., a security event) being detected by traffic analyzer 310. As another example, a particular policy from policy datastore 350 may be applied by policy engine 340 when triggered by QoS monitor 330 for a particular service or application. Such a policy may be defined to remedy QoE issues for the particular service or application based on QoS parameters not being met.

Figure 4:
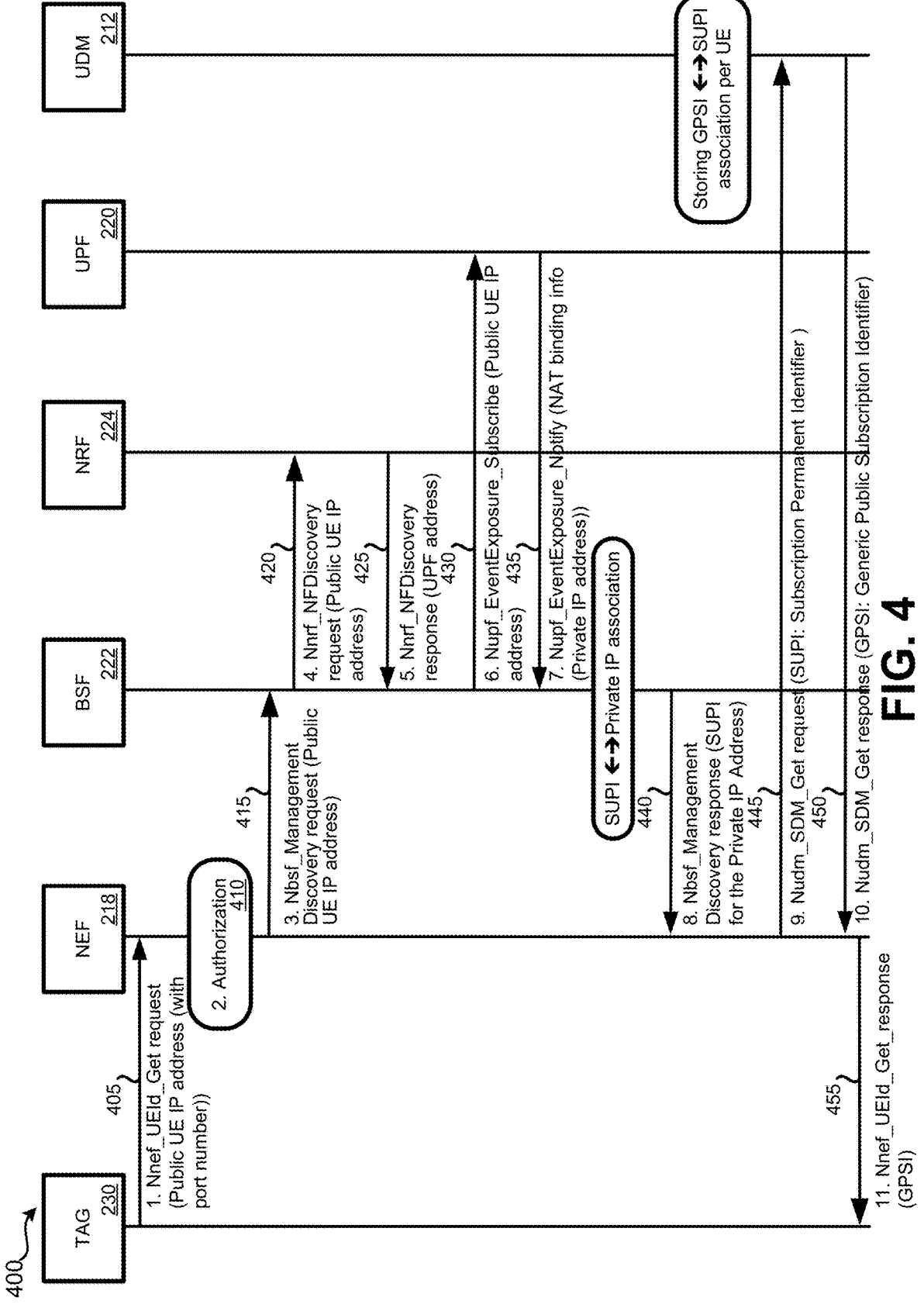
FIG. 4 illustrates an operation flow diagram corresponding to a method for a traffic analysis gateway to request a specific UE ID using UPF exposure with network address translation (NAT) at the UPF.

Various methods may be performed using the systems, arrangements, and methods described above. Accordingly, various embodiments according to the present disclosure may require that the TAG obtain a static, unique identifier of a particular UE device in order to provide various features specific to the particular UE device. However, as previously noted, conventional procedures are too complicated, inefficient, and require too much handshaking to provide information from the core. For example, FIG. 4 illustrates an operation flow diagram corresponding to a conventional method 400 for TAG 230 to request a specific UE ID using UPF exposure with NAT at the UPF 220.

As indicated by 405, TAG 230 may communicate a request for the static ID (e.g., GPSI) for a particular UE device to the NEF 218. In so doing, TAG 230 may provide the public IP address and port number (because one public IP address is per session of the UE and may be shared by many UE) to NEF 218. The public IP address may be that which a particular UE is using currently in a session. NEF 218 may authorize the TAG 230 and/or the request, as indicated by 410. As indicated by 415, NEF 218 may send binding information for management to the BSF 222, which may have access to an association between the private IP address and the Subscription Permanent Identifier (SUPI), which may correspond to an internal ID that is per UE that the 5G core may not expose to TAG 230. Instead of exposing the SUPI, the 5G core may expose the UE static ID (e.g., GPSI, which may correspond to a mobile subscriber ISDN number (MSISDN) or another external identifier that is globally unique for a particular UE) to TAG 230 at the end of the method 400, as indicated by 455.

However, BSF 222 may only have SUPI information; BSF 222 may store SUPI and the associated UE IP address (e.g., IPv6, Private UE IP address). As indicated by 420, BSF 222 may communicate a discovery request/query to NRF 224 in order to identify which UPF supports the public IP address. As indicated by 425, NRF 224 may respond with a particular UPF address of the UPF 220 that supports the public IP address. As indicated by 430, BSF 222 may communicate a request to UPF 220 for an association/ mapping between the public IP address and the private IP address, which may correspond to a request for NAT binding information. As indicated by 435, UPF 220 may return the NAT binding information, which may include the private IP address.

At that point, BSF 222 may know the public IP address is associated with which private IP address. For example, BSF 222 may have the mapping of the SUPI information and the private IP address. As indicated by 440, BSF 222 may communicate the SUPI information and the private IP address to NEF 218. As indicated by 445, NEF 218 may query UDM 212 for the GPSI information corresponding to the SUPI information. UDM 212 stores the association/ mapping of the GPSI and SUPI information. As indicated by 450, UDM 212 may return the GPSI information to NEF 218. As indicated by 455, NEF 218 may communicate the GPSI information back to TAG 230. Thus, method 400 may be a complicated procedure that is slower and more inefficient than necessary, with too many handshaking operations. Such inefficiencies may impact design operations, causing complexities and latencies that are undesirable. Disclosed embodiments, by contrast, are faster and more efficient.

Figure 5:
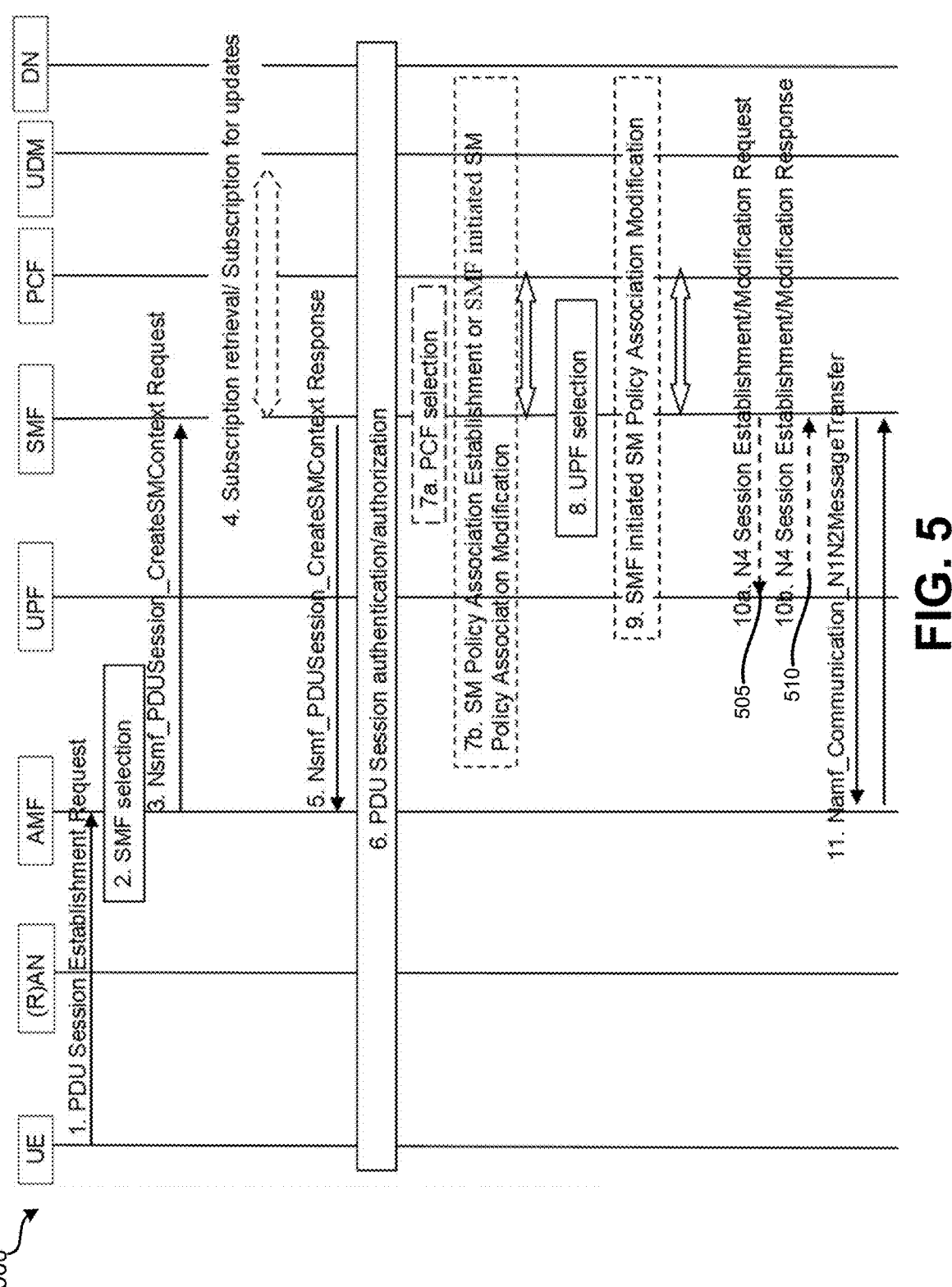
FIG. 5 illustrates an operation flow diagram corresponding to a method for PDU session establishment.

Disclosed embodiments may leverage UPF 220 being configured to store GPSI and SUPI information collected during PDU session establishment. FIG. 5 illustrates an operation flow diagram corresponding to a method 500 for PDU session establishment. Method 500 may include procedure between UPF 220 and SMF 214 is executed when a session is established for data exchange (e.g., via UPF, internet, and RAN having an established session). SMF 214 may handle going to PCF 216 to coordinate information for the session establishment, with SMF 214 being a control function.

Based on operator policy, UPF 220 may receive the GPSI and/or SUPI information for the particular UE during the session establishment procedure. SMF 214 may cause UPF 220 to make a session, with SMF 214 requesting such an establishment as indicated by 505. In so doing, SMF 214 may provide the GPSI and/or SUPI information for the particular UE to UPF 220. UPF 220 may then store the GPSI and/or SUPI information for the particular UE. As indicated by 510, UPF 220 may respond accordingly to the session establishment request from SMF 214.

FIG. 6 illustrates a table 600 indicating a portion of a session establishment request from SMF 214 to UPF 220 that may include a user ID 650. The table 600 may correspond to information that SMF 214 provides to UPF 220, which may include the GPSI and/or SUPI information for particular UE communicated to UPF 220 during the session establishment procedures. While other information not shown may be included, the user ID 650 may include various identification information.

Such identification information may include IMSI, GPSI, and SUPI for the particular UE involved in the session. Therefore, in accordance with embodiments disclosed herein, UPF 220 may store GPSI and/or SUPI information for the particular UE having a particular IP address for later use in providing GPSI information to TAG 230 when TAG 230 requests GPSI information for particular UE for which TAG 230 only has a public IP address. Accordingly, with disclosed embodiments of UPF 220 storing GPSI and/or SUPI information, a waste of the signaling resources involved in contacting BSF 222 or even UDM 212 may be obviated.

Figure 7:
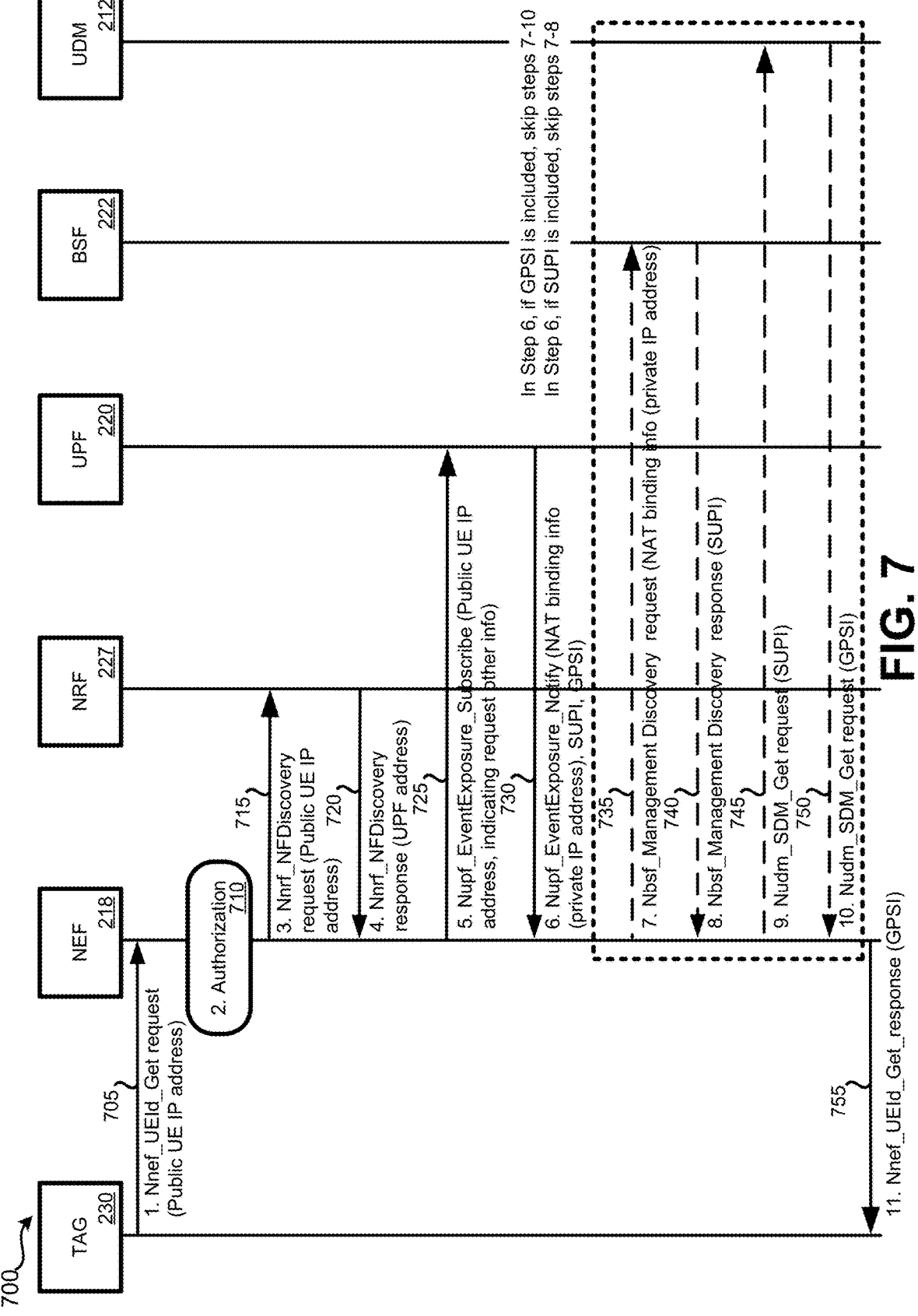
FIG. 7 illustrates an operation flow diagram corresponding to an improved method for a traffic analysis gateway to request a specific UE ID using UPF exposure with NAT at the UPF.

FIG. 7 illustrates an operation flow diagram corresponding to an improved method 700 for TAG 230 to request a specific UE ID using UPF exposure with NAT at the UPF

220, in accordance with embodiments disclosed herein. Instead of NEF 218 having to go to BSF 222, NEF 218 may go to NRF 227 first, then directly to UPF 220. As indicated by 705, TAG 230 may communicate a request for the static ID for a particular UE device to the NEF 218. In so doing, TAG 230 may provide the public IP address to NEF 218. The public IP address may be that which a particular UE is using currently in a session and/or as used in the previous session. As indicated by 710, NEF 218 may authorize the TAG 230 and/or the request. As indicated by 715, NEF 218 may send a discovery request with the public UE IP address to NRF 227 in order to identify which UPF supports the public IP address. As indicated by 720, NRF 224 may respond with a particular UPF address of the UPF 220 that supports the public IP address. As indicated by 725, NEF 218 may communicate a request to the identified UPF 220 for an association/mapping between the public IP address and the private IP address, which may correspond to a request for NAT binding information.

As indicated by 730, UPF 220 may return the NAT binding information, which may include the private IP address. In so doing, UPF 220 may return SUPI and/or GPSI information corresponding to the public IP address, depending on which information UPF 220 was previously able to collect from one or more previous PDU session establishments. From that point, flow may be conditional depending on the information returned by UPF 220. The information returned by UPF 220 may depend on which information was previously received and stored by UPF 220 during session establishment procedures. The variance in whether such information was received and stored may depend on operator policy.

If UPF 220 has GPSI information, UPF 220 may return the GPSI information to NEF 218 in response the NEF 218 request. When UPF 220 returns GPSI information, the flow may proceed directly to 755, where NEF 218 may communicate the GPSI information back to TAG 230. This may apply in situations where UPF 220 has the GPSI information and the SUPI information or when UPF 220 has the GPSI information but not the SUPI information.

If UPF 220 has the SUPI information but not the GPSI information, UPF 220 may return the SUPI information in response the NEF 218 request. When UPF 220 returns the SUPI information, the flow may proceed to 745. As indicated by 745, NEF 218 may query UDM 212 for the GPSI corresponding to the SUPI. As indicated by 750, UDM 212 may return the GPSI information to NEF 218, which may then communicate the GPSI information back to TAG 230, as indicated by 755.

In the event, however, that UPF 220 does not have or does not return either GPSI information or SUPI information when responding to NEF 218 as indicated by 730, the flow may proceed to 735. As indicated by 735, NEF 218 may send binding information for management to the BSF 222. As indicated by 740, BSF 222 may communicate the SUPI information and the private IP address to NEF 218. Then, flow may proceed to 745, 750, and 755.

Accordingly, method 700 allows for bypassing of subprocesses based on different deployment scenarios. This may include bypassing subprocesses of 735, 740, 745, and 750 when UPF 220 has stored and returned GSPI information. This may also include bypassing of subprocesses 735 and 740 when UPF 220 has stored SUPI information.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well known processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed:

1. A system to uniquely identify user equipment with a wireless network, the system comprising:
   a cellular network core that comprises a user plane function (UPF), where:
      the UPF collects and stores subscription permanent identifier (SUPI) information and/or generic public subscription identifier (GPSI) information corresponding to a particular user equipment (UE) having a particular Internet Protocol (IP) address;
      in response to a request, the cellular network core executes a conditional process based at least in part on the UPF using the SUPI information and/or the GPSI information as part of the conditional process to respond to the request, wherein:
         the request is for GPSI information corresponding to the particular UE;
         an external IP address of the particular UE is provided along with the request; and
      upon completion of the conditional process, when the GPSI information corresponding to the particular UE is present in the UPF, the cellular network core bypasses a binding support function (BSF) and a unified data management (UDM) and returns the GPSI information corresponding to the particular UE.

2. The system to uniquely identify user equipment with a wireless network as recited in claim 1, wherein the UPF collects and stores the SUPI information and/or the GPSI information as part of establishing a session involving the particular UE having the particular IP address.

3. The system to uniquely identify user equipment with a wireless network as recited in claim 1, wherein the UPF receives the SUPI information and/or the GPSI information from a session management function (SMF) of the cellular network core.

4. The system to uniquely identify user equipment with a wireless network as recited in claim 1, wherein the conditional process allows for bypassing of subprocesses involving the BSF of the cellular network core when the UPF uses the stored SUPI information.

5. The system to uniquely identify user equipment with a wireless network as recited in claim 1, wherein the conditional process allows for bypassing of subprocesses involving the UDM of the cellular network core when the UPF uses the stored GPSI information.

6. The system to uniquely identify user equipment with a wireless network as recited in claim 1, wherein the request is from a traffic analysis gateway.

7. The system to uniquely identify user equipment with a wireless network as recited in claim 1, wherein the request is directed to a network exposure function (NEF) of the cellular network core.

8. The system to uniquely identify user equipment with a wireless network as recited in claim 1, wherein the cellular network core receives an external IP address of the particular UE along with the request.

9. The system to uniquely identify user equipment with a wireless network as recited in claim 1, wherein the cellular network core returns the GPSI information corresponding to the particular UE to an application function.

10. A method to uniquely identify user equipment with a wireless network, the method comprising:
    collecting, by a user plane function (UPF) of a cellular network core, subscription permanent identifier (SUPI) information and/or generic public subscription identifier (GPSI) information corresponding to a particular user equipment (UE) having a particular Internet Protocol (IP) address;
    storing, by the UPF, the SUPI information and/or the GPSI information corresponding to the particular UE having the particular IP address;
    in response to a request, the cellular network core executes a conditional process based at least in part on the UPF using the SUPI information and/or the GPSI information to respond to the request, wherein:
       the request is for GPSI information corresponding to the particular UE; and
       an external IP address of the particular UE is provided along with the request; and
    upon completion of the conditional process, when the GPSI information corresponding to the particular UE is present in the UPF, the cellular network core bypasses a binding support function (BSF) and a unified data management (UDM) and returns the GPSI information corresponding to the particular UE.

11. The method to uniquely identify user equipment with a wireless network as recited in claim 10, wherein the UPF collects and stores the SUPI information and/or the GPSI information as part of establishing a session involving the particular UE having the particular IP address.

12. The method to uniquely identify user equipment with a wireless network as recited in claim 10, wherein the UPF receives the SUPI information and/or the GPSI information from a session management function (SMF) of the cellular network core.

13. The method to uniquely identify user equipment with a wireless network as recited in claim 10, wherein the conditional process allows for bypassing of subprocesses involving the BSF of the cellular network core when the UPF uses the stored SUPI information.

14. The method to uniquely identify user equipment with a wireless network as recited in claim 10, wherein the conditional process allows for bypassing of subprocesses involving the UDM of the cellular network core when the UPF uses the stored GPSI information.

15. The method to uniquely identify user equipment with a wireless network as recited in claim 10, wherein the request is from a traffic analysis gateway.

16. One or more non-transitory, machine-readable media having machine-readable instructions thereon which, when executed by one or more processing devices, cause the one or more processing devices to perform operations to uniquely identify user equipment with a wireless network, the operations comprising:

collecting, by a user plane function (UPF) of a cellular network core, subscription permanent identifier (SUPI) information and/or generic public subscription identifier (GPSI) information corresponding to a particular user equipment (UE) having a particular Internet Protocol (IP) address;

storing, by the UPF, the SUPI information and/or the GPSI information corresponding to the particular UE having the particular IP address;

in response to a request, the cellular network core executes a conditional process based at least in part on the UPF using the SUPI information and/or the GPSI information to respond to the request, wherein:

the request is for GPSI information corresponding to the particular UE; and an external IP address of the particular UE is provided along with the request; and upon completion of the conditional process, when the GPSI information corresponding to the particular UE is present in the UPF, the cellular network core bypasses a binding support function (BSF) and a unified data management (UDM) and returns the GPSI information corresponding to the particular UE.

17. The one or more non-transitory, machine-readable media as recited in claim 16, wherein the UPF collects and stores the SUPI information and/or the GPSI information as part of establishing a session involving the particular UE having the particular IP address.

18. The one or more non-transitory, machine-readable media as recited in claim 16, wherein the UPF receives the SUPI information and/or the GPSI information from a session management function (SMF) of the cellular network core.

19. The one or more non-transitory, machine-readable media as recited in claim 16, wherein the conditional process allows for bypassing of subprocesses involving the BSF of the cellular network core when the UPF uses the stored SUPI information.

20. The one or more non-transitory, machine-readable media as recited in claim 16, wherein the conditional process allows for bypassing of subprocesses involving the UDM of the cellular network core when the UPF uses the stored GPSI information.

* * * * *